United States Patent
Sagduyu et al.

(10) Patent No.: US 10,719,779 B1
(45) Date of Patent: Jul. 21, 2020

(54) SYSTEM AND MEANS FOR GENERATING SYNTHETIC SOCIAL MEDIA DATA

(71) Applicant: Intelligent Automation, Inc., Rockville, MD (US)

(72) Inventors: Yalin Evren Sagduyu, Gaithersburg, MD (US); Jason Li, Potomac, MD (US); Yi Shi, Germantown, MD (US); Alexander Grushin, Rockville, MD (US); Ziad El-Jamous, Rockville, MD (US)

(73) Assignee: Intelligent Automation, Inc., Rockville, MD (US)

( * ) Notice: Subject to any disclaimer, the term of this patent is extended or adjusted under 35 U.S.C. 154(b) by 844 days.

(21) Appl. No.: 15/393,582

(22) Filed: Dec. 29, 2016

Related U.S. Application Data (60) Provisional application No. 62/272,793, filed on Dec. 30, 2015.

(51) Int. Cl.
  *G06N 5/04* (2006.01)
  *G06N 20/00* (2019.01)
  *G06N 7/00* (2006.01)

(52) U.S. Cl.
  CPC ............ *G06N 20/00* (2019.01); *G06N 7/005* (2013.01); *G06N 5/04* (2013.01)

(58) Field of Classification Search
  None
  See application file for complete search history.

(56) References Cited

U.S. PATENT DOCUMENTS

| | | |
|---|---|---|
| 2005/0039107 A1 | 2/2005 | Hander et al. |
| 2015/0082448 A1 | 3/2015 | Elovici et al. |

OTHER PUBLICATIONS

Wang, et al., Social Event Detection with Interaction Graph Modeling, Proceedings of the 20th ACM international conference on Multimedia, (2012) pp. 865-868 (Year: 2012).*

(Continued)

*Primary Examiner* — Wilbert L Starks
(74) *Attorney, Agent, or Firm* — Krieg DeVault, LLP; Daniel Tychonievich (57) ABSTRACT

System and means generates synthetic forms of social media data such as data from microblogging services (e.g., Twitter) and social networking services (e.g., Facebook). This system and means jointly generate interaction graph structures and text features similar to input social media data. First, an interaction graph is generated by mapping social network interactions in input (real) social media data to graph structures. This interaction graph is fitted to a social network model (or a composite model) by minimizing the distance between the input and the synthetic interaction graphs (of potentially different sizes). The distance is measured statistically or based on the performance of social media analytics. Various patterns (such as anomalies), interaction types and temporal dynamics are generated synthetically. Second, text features are extracted from input social media data with topic modeling and statistical analysis of word tuple distributions. Based on these features, synthetic social media text is generated. Third, synthetic graph structures and text features are combined to generate the synthetic social media data. The system is particularly useful in generating data to be used for developing and testing new social media analytics or for generating or analyzing social bot network behavior and campaigns in social media, and for sharing test data with others without rate and privacy concerns.

10 Claims, 4 Drawing Sheets

(56) References Cited

OTHER PUBLICATIONS

Bhagat, et al., Class-based graph anonymization for social network data, VLDB '09, 2009, pp. 1-12 (Year: 2009).*

A. Sala, L. Lili, C. Wilson, R. Zablit, H. Zheng, and B. Y. Zhao, "Measurement-calibrated Graph Models for Social Network Experiments," WWW 2010, Apr. 2630, 2010, Raleigh.

J. Leskovic, J. Kleinberg, and C. Faloutsos, "Graphs over time: Densification laws, shrinking diameters and possible explanations," in Proc. of ACM KDD, 2005.

A. Vazquez, "Growing network with local rules: Preferential attachment, clustering hierarchy, and degree correlations," Physical Review E 67-056104, 2003.

D. Kempe, J. Kleinberg, and E. Tardos, "Maximizing the spread of influence through a social network," in Proc. ACM Special Interest Group on Knowledge Discovery and Data M.

P. Mahadevan, D. Krioukov, K. Fall, and A. Vandat. "Systematic topology analysis and generation using degree correlations," In Proc. of SIGCOMM, 2006.

D. Blei, A. Ng, and M. Jordan, "Latent Dirichlet allocation," Journal of Machine Learning Research 3(4-5), pp. 993-1022, 2003.

D. Jurafsky and J. Martin, Speech and Language Processing, Prentice Hall, 2000.

* cited by examiner

SYSTEM AND MEANS FOR GENERATING SYNTHETIC SOCIAL MEDIA DATA

This invention was supported in part by the Defense Advanced Research Projects Agency (DARPA) grant number W31P4Q-13-C-0055. The Government has certain rights in the invention.

BACKGROUND OF THE INVENTION

This application claims priority to U.S. Provisional Patent Application Ser. No. 62/272,793 filed on Dec. 30, 2015, the complete disclosure of which is incorporated by reference herein.

The subject invention relates to a system and means for generating synthetic social media data, and in particular, to a system and means for generating large volumes of synthetic data for social media, such as from microblogging or social networking services. The system and means can generate synthetic graph structures and text features and combine them to produce large-scale and anonymized social media data that is similar to input social media (in terms of statistical and application-level properties).

Due to advances in computer and communication technologies, social media has been growing at a fast pace with various microblogging and social networking services that have been generating large-scale data. Social media provides rich data feeds that can be utilized for different purposes such as marketing, advertisement, and analysis and forecast of social events. However, the full capture and understanding of social media is largely missing due to the growing number and type of data feeds with complex interactions among social network actors. Therefore, social media analytics (algorithms analyzing social media data, including graph, machine learning and natural language processing algorithms) are needed to systematically extract, capture and analyze social media data.

In turn, research and development progress in social media analytics depends on the availability of social media data to model and analyze social behavior. Existing small and static data sets cannot keep up with growing social media feeds. Social media data is available through either public Application Program Interfaces (APIs) or paid data services. However, there are both rate and privacy limitations on collecting, sharing or distributing new social media data (such as Facebook or Twitter data) for controllable and repeatable test and evaluation. These limitations may slow down progress in social network research and social media analytics by granting data access only to a small group of researchers and preventing full data disclosure that would be necessary to verify and further improve results reported in research findings. Therefore, it is important to generate large-scale synthetic data sets that reflect real-word data sets in terms of statistical or application properties and can be shared with others without rate and privacy concerns. In addition, synthetic data can be used to generate and analyze large-scale and high fidelity behavior of networks of social bots (automated social media posting programs, such as spammers) as well as campaigns (such as for marketing, advertisement and recruitment) in social media.

SUMMARY OF THE INVENTION

In one embodiment of the invention, a system and means is provided for generating synthetic social media data. The system generates the underlying graph structure and the text content jointly by fitting to the graph, text, statistical and temporal characteristics of input data generated by social media, such as data from microblogging (e.g., Twitter) or social networking (e.g., Facebook) services.

To generate synthetic graph structures, a social interaction graph is generated from social media interactions in a given social media data set by assigning users and other social media entities (such as hashtags in Twitter) to vertices (or nodes) in the interaction graph and assigning social media interactions between two entities (e.g., mention, reply and retweet in Twitter) to edges (or links) in the interaction graph.

Then, a synthetic graph similar to the given interaction graph is generated by minimizing the distance (statistical or application dependent) between the input and candidate synthetic graphs. Synthetic patterns (such as anomalies in form of high degree vertices, hubs, and cliques) are added to the synthetic graph. The synthetic graph is generated with multiple connected components, attributes (such as group memberships) and interaction types, and fitted to composite social network models and temporal dynamics in the input data.

The textual content is extracted from a given social media data set and synthetically generated by dividing data based on topics (by applying topic modeling), training a n-gram model (Markov chain) for each topic, sampling text data from the models, and filtering synthetic social media posts with identical text or with grammar mistakes. Social media entities (e.g., hashtags and hyperlinks in tweets) are added with the same distributions as in the input data.

Large-scale synthetic social media data sets are generated by combining the synthetic graph and synthetic textual content. Graph properties of social media entities (such as hashtags in Twitter) in the input interaction graph and synthetic graph are matched with each other and text is selected for the most dominant topic assigned to some localized subset of vertices in the synthetic graph. Synthetic data generation is scaled up beyond the size of input social media data by sampling vertices and edges according to the fitted social network model and sampling text and social media entities according to their statistical properties in the input social media data. The time complexity of graph fitting can be reduced by generating synthetic graphs that are smaller than input graphs and measuring the distance between these graphs of different sizes. Synthetic data generation is parallelized by dividing the input social media data into multiple sets by the posting time, generating synthetic social media for each set, and combining data sets through common user names and social media text entities.

The system beneficially allows for synthetically generating high fidelity, large-scale, dynamic and anonymous social media data that can be used for developing and testing social media analytics or generating and analyzing high fidelity and large-scale social bot networks as well as campaigns in social media, and can be shared without rate and privacy concerns.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 1:
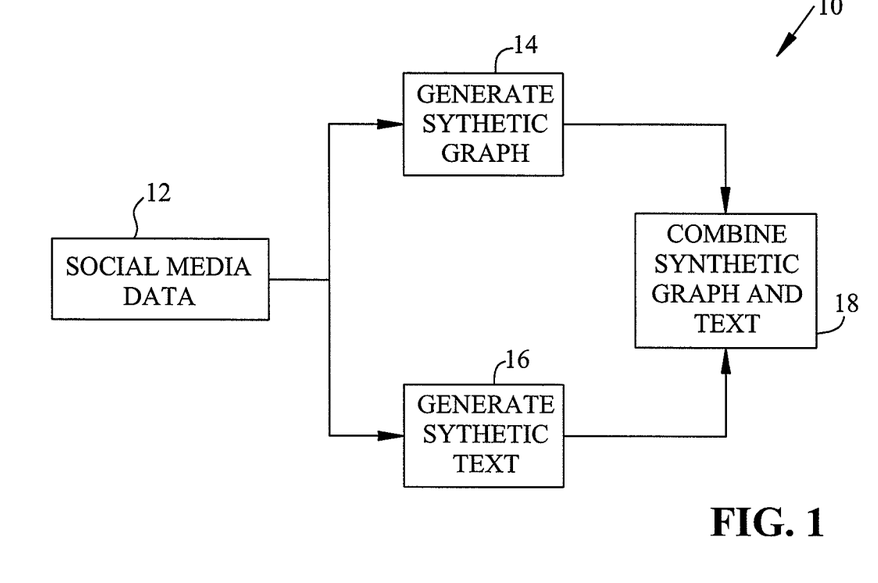
FIG. 1 is a diagram for the three main steps in generating social media data, where step 1 generates synthetic graph structures 14, step 2 generates synthetic text 16, and step 3 combines synthetic text and graph structures through synthetic social media entities 18.

Now referring to FIG. 1, a diagram shows there are three main steps in generating synthetic social media data is shown generally indicated as 10. Social media data as an input is indicated as 12 and from that synthetic graph structures are generated 14 and synthetic text is generated 16. The last step is combining synthetic graph and synthetic text structures 18 through the generation of social media entities.

Figure 2:
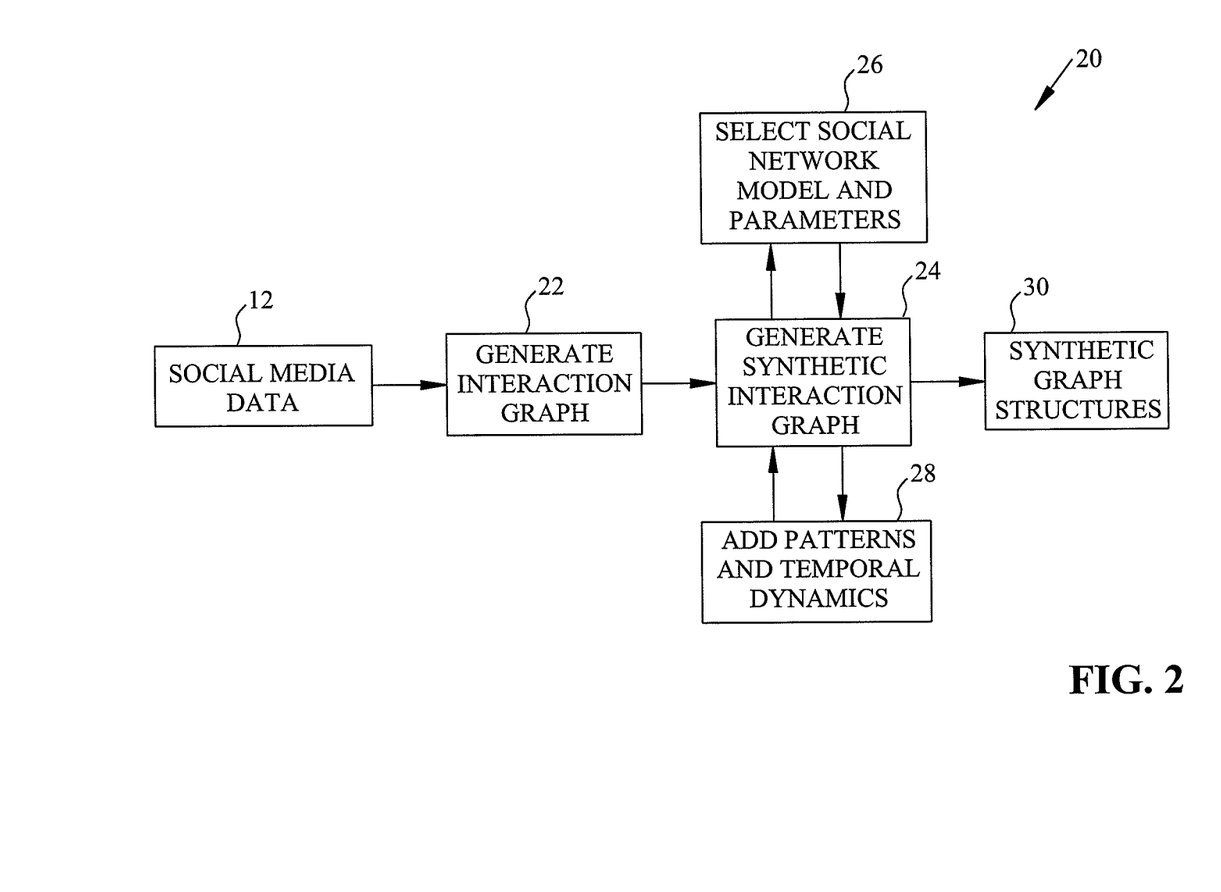
FIG. 2 is a diagram for generating synthetic graph structures.

Means to generate synthetic graph structures G' for social media are illustrated, generally indicated as 20, in the diagram of FIG. 2. An interaction graph G is extracted from the input social media data. An interaction graph represents how social network actors interact with each other. Entities and interactions among social media entities are identified and an interaction graph is built 22 with a vertex (node) set including entities and an edge (link) set representing interactions. Also, an attribute set is defined, which may include both vertex attributes and edge attributes. Twitter data may be used, for example. The vertex set then includes users and hashtags while the edge set includes replies, retweets, and mentions. User information, such as language, location, etc., is defined as user attributes, and edge attributes are defined by the number of interactions between two vertices.

A synthetic interaction graph G' is generated 24 via some social graph model, minimizing the distance between the real and synthetic interaction graphs. There are various social graph models that can generate a large graph with a small number of parameters. For example, the Forest Fire algorithm identified by J. Leskovic et al. in an article entitled "Graphs over time: Densification laws, shrinking diameters and possible explanations" has two parameters to select. The parameters are tuned such that the distance $d(G,G'(p))$ between the real and synthetic interaction graphs is minimized over parameters p; i.e., the synthetic graph $G'(p^*)$ is generated with parameters $p^* = \text{argmin}_p d(G,G'(p))$. This distance d can be either defined by graph properties, e.g., the dK-2 distance between joint degree distributions, or by applications, e.g., the difference between lengths of cascades corresponding to influence spreads when influence spread is used as the application. Under the joint degree distribution distance, the number of edges ($n_{ij}$ for the real graph and $n'_{ij}$ for the synthetic graph) is identified connecting a vertex with degree i to a vertex with degree j. The distance is then defined as $(\Sigma_{i,j}(n_{ij}-n'_{ij})^2)^{1/2}$. Under the influence distance, first the maximum number of vertices ($n_k$ for the real graph and $n'_k$ for the synthetic graph) that can be influenced by some given number of seeds (say k) is computed. The distance is then defined as $|n_k - n'_k|$. There are also non-parametric graph models, such as dK-2 model that minimizes dK-2 distance as identified by P. Mahadevan in the article "Systematic topology analysis and generation using degree correlation", that can be readily applied here without a need to select parameters. Then, the best social network model (with the best parameters, if any) that minimizes the distance is selected 26, and the synthetic interaction graph is generated according to the selected social network model (with the best set of parameters, if any).

Graph patterns 28, such as connectivity anomalies, are generated in the synthetic interaction graph. Here, an anomaly corresponds to a local structure that is significantly different from other parts of a graph, e.g., a high-degree vertex or a high-degree vertex with low-degree neighbors, such as a hub, or a large-size clique where every pair of vertices are connected. Such a structure can exist in the real interaction graph but may not be generated by social graph models. Patterns in the real graph are analyzed and then similar structures 30 are generated in the synthetic interaction graph. For that purpose, all vertices in these patterns and all associated edges are removed from the input graph. Denote the graph of removed patterns as $\tilde{G}$ and the remaining graph as $\hat{G}$. Each vertex i in $\tilde{G}$ has a vertex property $c_i$, which is the number of edges connecting vertex i and a vertex in $\hat{G}$. After a synthetic graph is generated for graph $\hat{G}$, $\tilde{G}$ is re-attached to this synthetic graph by adding $c_i$ edges for each vertex i. For high-degree anomalies, such as hubs, the following alternative procedure can be also applied. For each vertex v in the real graph that has a degree greater than a threshold, one of the higher-degree vertices v' in the synthetic graph is selected, and some topologically-proximate, but non-neighboring, vertices are rewired to become neighbors of v', until the degree of v' becomes close to the degree of v. This procedure preserves both the number of edges and the connectivity of the graph while generating vertices with high degrees.

A synthetic graph with multiple connected components is generated. Social graph models typically generate one connected graph while the input graph may be disconnected. To have the same connectivity, the entire graph should not be generated at once. Instead, all connected components in the input graph should be found. In general, a giant connected component can be found in a social graph and remaining components are relatively smaller. One or more of the largest components is fitted, while the remainder of the input graph is returned unchanged. For, example, components may be fit one by one in the non-increasing order of component size (the number of vertices in a component) and terminated once most (e.g., 90%) of the input graph is fitted.

A synthetic graph with attributes is generated. Social graph models, such as Forest Fire, typically generate a synthetic graph by adding vertices one by one and adding associated edges when a vertex is added to the graph. Vertex attributes, such as group membership, are assigned randomly, based on the group distribution of vertices in the input data. That is, suppose in the input data, $p_i$ is the number of vertices in group i (e.g., user vertices, as opposed to hashtag vertices) divided by the number of all vertices. Then, a new vertex in the synthetic graph is assigned as a member of group i with probability $p_i$. Associated edges are added randomly, based on the joint group distribution in the input data. That is, suppose a vertex in group i is added in the synthetic graph and given that one vertex of an edge is in group i in the input data, $p_{ij}$ is the number of edges with another vertex in group j divided by the number of all edges with a vertex in group i. Then with probability $p_{ij}$, the newly added vertex is connected to a vertex in group j.

A synthetic graph is generated by fitting to composite social network models, which are models that combine more than one social network model. A synthetic graph can be generated by two graph models with a parameter $r \in (0,1)$ as follows. A synthetic graph with r×n vertices (smaller than the target output graph), where n is the number of vertices in the input graph, is generated by the first model. Then the second graph model is used to add more vertices and edges to this small graph such that a synthetic graph with a total of n vertices is obtained.

Interaction types are generated in synthetic graphs. The edges of the synthetic graph are probabilistically labeled as representing interaction types (e.g., retweets, replies and mentions in Twitter) and their numbers. Define a=tail(e) as the tail and b=head(e) as head of edge e=(a,b), and deg(x) as the degree of vertex x. Let $P_{cat(e),deg(tail(e)),deg(head(e))}(w_1, w_2, \ldots, w_n)$ denote the joint distribution of weights $w_1, w_2, \ldots, w_n$ (corresponding to the number of interactions of type 1, 2, . . . , n represented by the edge) conditioned on the edge being of category cat(e) (e.g., user-user vs. user-hashtag) with degrees deg(tail(e)) and deg(head(e)). This distribution is computed from the input graph and it is used to probabilistically assign edge weights $w_1'; w_2', \ldots, w_n'$ to edges in the synthetic graph. If the synthetic graph has an edge with degrees x and y for which no distribution exists in the real graph, then we instead use an existing joint distribution $P_{cat(e),x',y'}$ to assign weights, selecting (x', y') to be as close as possible to (x, y).

A synthetic graph with temporal dynamics 28 is generated. Denote $G_1, G_2, \ldots$ as a sequence of input graphs. There are overlapping structures among these graphs, i.e., $n_{i,j+1}$, is the number of vertices in $G_i \cap G_j$ or $G_i \cap G_{i+1}$. A sequence of synthetic graphs is generated as follows. (1) Generate the first synthetic graph $S_1$ for $G_1$. (2) Given $S_i$ and $n_{i,j+1}$, randomly keep $n_{i,j+1}$ vertices in $S_i$ and edges among them. Then apply a graph model to add more vertices and edges to this small graph such that a synthetic graph $S_{i+1}$ with the same number of vertices as $G_{i+1}$ is obtained. Temporal correlation is preserved in terms of the Jaccard index $|E_i \# E_{i+1}|/|E_i \cup E_{i+1}|$ of edge sets across any pair of time instances i and i+1.

To reduce the time complexity of graph fitting, a smaller synthetic graph is generated and the distance between that graph and input graph is measured by an extended dK-2 distance. Suppose two graphs G and G' are compared, where the number of vertices in G and G' are n and m, respectively. Suppose n≥m. For $i,j \in [1,m]$, denote as the number of edges between a vertex with degree i and a vertex with degree j in G and $e'_{ij}$ as the number of edges between a vertex with degree i and a vertex with degree j in G'. Define $$p_{ij} = \frac{e_{ij}}{\sum_{i=1}^{m}\sum_{j=i}^{m} e_{ij}} \text{ and } p'_{ij} = \frac{e'_{ij}}{\sum_{i=1}^{m}\sum_{j=i}^{m} e'_{ij}}.$$

The new dK-2 distance is $$\sqrt{\sum_{i=1}^{m}\sum_{j=i}^{m} (p_{ij} - p'_{ij})^2}.$$

This new compressed dK-2 distance is scaled up by multiplying with the number of edges in graph G to the order of the dK-2 distance used before.

Figure 3:
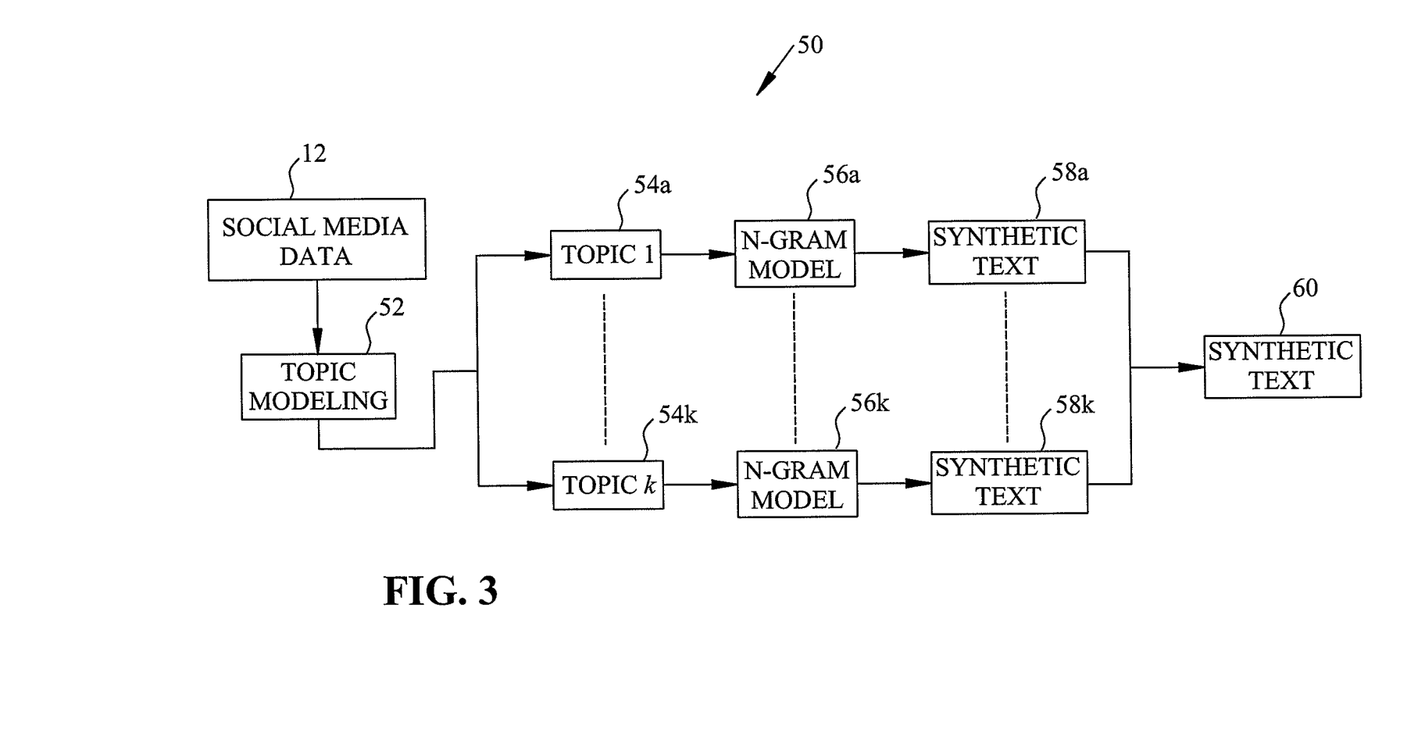
FIG. 3 is a diagram for generating synthetic text.

Means to generate synthetic text 60 for social media are shown in the diagram, generally indicated as 50 in FIG. 3. The textual content of social media is modeled as a set of posts P, where each post $P_i=(w_1, w_2, \ldots, w_m) \in P$ is a sequence of terms $w_k$. Here, $w_k$ is an ordinary word or a special social media entity such as a username, hashtag or hyperlink. Before the textual content of synthetic social media posts P' is generated, real social media posts P are classified according to the dominant topic $T(P_i)$ of the post. Topics are identified by applying the Latent Dirichlet Allocation (LDA) algorithm, identified by D. Blei et al. in the article "Latent Dirichlet allocation" to the text of the real posts after removing stopwords. LDA models 52 each post $P_i \in P$ as a mixture of some fixed set of topics $\{T_1, T_2, \ldots T_n\}$ 54a-k, where each topic is a vector in the space of the terms $w_k$. The dominant topic $T(P_i)$ is $T_d$, such that $d = \text{argmax}_j p_{ij}$, where $p_{ij}$ is the probability of topic $T_j$ for post $P_i$. All posts where some topic $T_d$ dominates (in the mixture) are placed into the same class d. Synthetic textual content 58a-k is then generated separately for each class/topic.

To generate content for posts belonging to some class d, part-of-speech tagging is first applied to find the grammatical category $g(w_k)$ for each term $w_k$ in the post. These categories include both standard parts-of-speech such as noun, verb and adjective, as well as social media entities such as usernames, hashtags and hyperlinks. From this tagged set of posts, a Markov chain $M_d$ (more specifically, an n-gram model) 56a-k is constructed. For example, the posts "I like dogs" and "I like cats" will result in the following second-order Markov chain (3-gram): (a)\alpha=>[I/pronoun, I/pronoun];(b) (\alpha, I/pronoun)=>[like/verb, like/verb];(c) (I/pronoun, like/verb)=>[dogs/noun, cats/noun]; (d) (like/verb, dogs/noun)=>\omega; (e) (like/verb, cats/noun)=>\omega. Here, \alpha and \omega indicate the beginning and the end of a post, respectively.

From each Markov chain $M_d$, synthetic posts $P_i'=(w_1', w_2', \ldots, w_m')$ are stochastically generated, where each $w_k'$ in $P_i'$ is a term from the original set of posts P. Notably, the word frequencies and transition probabilities in the synthetic posts reflect the word frequencies and transition probabilities in the real posts. Furthermore, because generation is performed separately for each LDA topic $T_d$, the resulting text is less likely to contain incoherent sentences that begin with one topic, and end with another. Finally, because part-of-speech tagging is performed, the generation process is more likely to preserve the grammatical rules inherent in the real posts. To further improve grammar, a postprocessing step is applied, where any synthetic post $P_i'$ whose grammar significantly violates the grammatical rules found in the original set of posts P are automatically identified, and the post is removed. In another postprocessing step, the synthetic posts and real posts are ensured to contain distinct text, by removing any synthetic post whose textual content is too similar to the textual content of some real post. A synthetic post $P_i'$ can be identified to be too similar to a real post $P_i$ if the sequence of terms in $P_1'$ (excluding social media entities, such as usernames, hashtags and hyperlinks) is contained as a subsequence within the terms of $P_i$.

At this point, the usernames, hashtags and hyperlinks in the synthetic posts P' are the same ones that were present in the real posts P. Hyperlinks can be randomly replaced with other hyperlinks that exist in some other set of social media posts Q that is different from P, but that is thematically related. For example, for Twitter, hyperlinks are generated by collecting a separate set of real tweets Q through Twitter's streaming APIs, using keywords similar to those that were used to obtain the input data set P. The generation of synthetic users and hashtags is described next.

Figure 4:
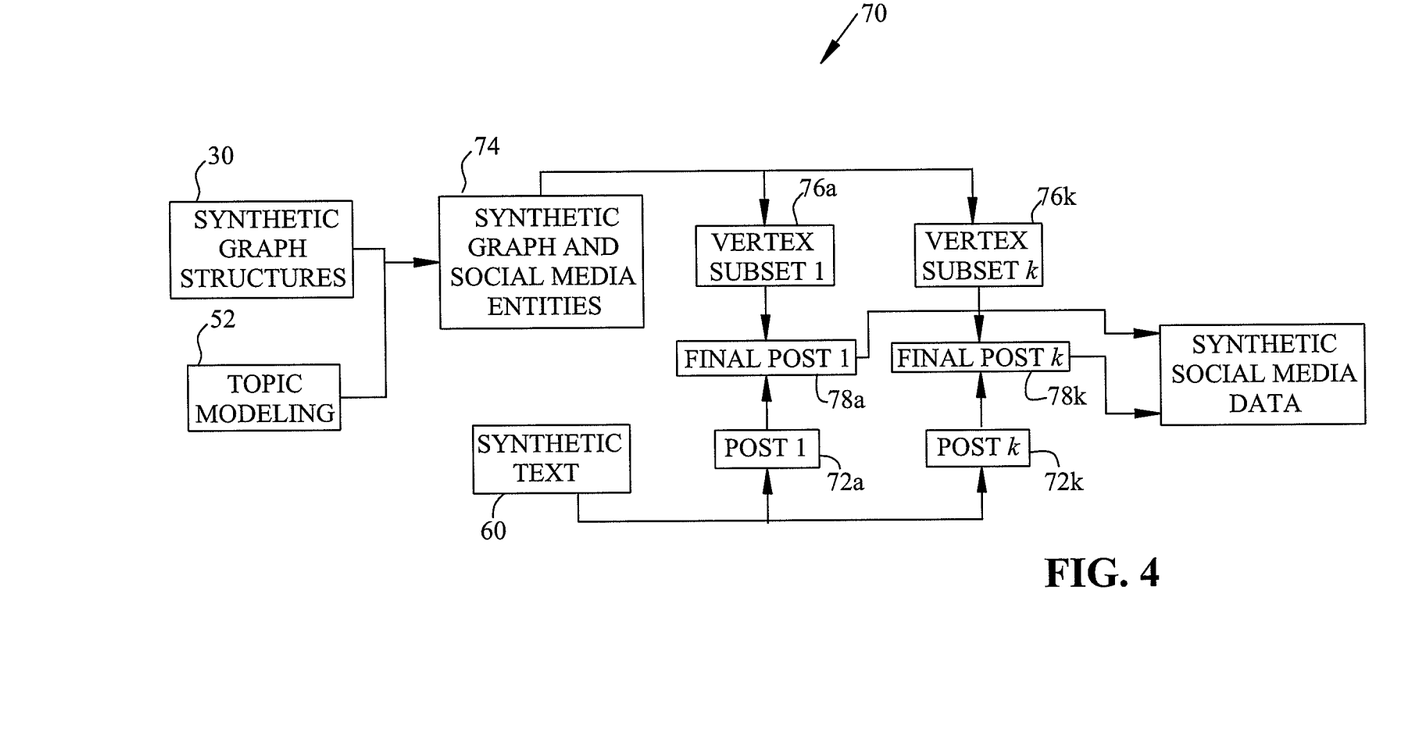
FIG. 4 is a diagram for generating synthetic social media entities and combining them with synthetic text and graph structures.

Means to generate synthetic social media entities 68 and combine the synthetic graph with the synthetic text are shown, generally indicated as 70, in the diagram of FIG. 4.

The generated synthetic social media posts P' 72a-k are connected with the synthetic graph G' by replacing social media entities (such as usernames and hashtags) 74 in posts $P_i' \in P'$ with the labels from the vertices V' and edges E' of G'. It is therefore first necessary to generate these labels. If $v' \in G'$ is a user vertex, then it is assigned a random string of characters u(v') as the synthetic username. If v is a hashtag vertex, then it is assigned a synthetic hashtag as follows. For each hashtag vertex v in the real graph, a procedure attempts to find a hashtag vertex v' in the synthetic graph, such that v and v' have a similar degree. Then, the vertex v' is labeled with the most common dominant topic $T(v')=T_d$ among all real posts P that mention v (recall that each post has been labeled with its dominant topic $T_d$, via LDA). The hashtag name h(v') for v' is generated by randomly choosing and combining one or two LDA terms from this topic, where the probability of choosing a particular term $w_k$ is proportional to $q_{dk}$, which is defined as the probability of term $w_k$ for topic $T(v')=T_d$ (as computed by LDA).

A fully synthetic post $P_i''$ 78a-k is generated as follows: For each iteration, some synthetic edge $e'=(u', v') \in E'$ is selected. One vertex of e' (without loss of generality, call it u') is the user who created the post. Now, let S'(u') 76a-k be a subset of vertices that are adjacent to u', randomly drawn from the distribution of social media entities in the real set of posts P (for example, if posts in P contain two user mentions on the average, then the expected number of user vertices in S'(u') will be 2). A post in $P_i' \in P'$ 72a-k is randomly selected whose entities as closely as possible match the entities in S'(u'). For example, if S'(u') contains one user vertex $s_1'$ and two hashtag vertices $s_2'$ and $s_3'$, then we select $P_i'$ such that one of its terms (call it $w_1'$) is a username and two of its terms ($w_2'$ and $w_3'$) are hashtag names. Then, terms in $P_i'$ are replaced with vertex labels as appropriate; i.e., $w_1'$ is replaced with $u(s_1')$, and $w_2'$ and $w_3'$ are replaced with $h(s_2)$ and $h(s_3)$.

The real usernames and hashtags in post $P_i'$ are thus replaced with synthetic usernames and hashtags, yielding a fully synthetic post $P_i''$. The above process is then repeated for different edges of G', in order to generate a final set of fully synthetic posts P''' 80. Note that after each iteration, the selected post $P_i'$ is removed from P', to avoid unnecessary duplication in the generated posts. In order to be able to select an appropriate post $P_i'$ (with username counts and hashtag counts that match the user vertex counts and hashtag vertex counts, respectively, in S'(u')) in every iteration, P' is typically overgenerated.

Notably, in the above procedure, for cases where S'(u') contains hashtag vertices, it is attempted to select $P_i'$ such that its dominant topic $T(P_i')$ matches the most common topic found among the hashtag vertices. In the above example, $P_i'$ is picked such that $T(P_i')=T(w_2')$ or $T(P_i')=T(w_3')$ (if the hashtag vertices have different topics assigned to them, then the tie is broken arbitrarily). Because topics T(v') were assigned to vertices based on their degree (as described earlier), the synthetic hashtag assignment process thus bridges content and topology.

Furthermore, in the above example, we probabilistically select an interaction type for the edge $(u',s_1')$. If the type is a reply (i.e., u' replies to $s_1'$), then we also generate the original post (to which this is a reply), as described above, but using the subset of vertices $S'(s_1')$ and selecting a post $P_j$, such that $T(P_j')=T(P_i')$ (i.e., the reply and the original post should have the same LDA topic). Finally, if $(u', s_1')$ is a retweet, then we simply replicate the generated retweet $P_i''$ to generate the original tweet $P_j''$.

Synthetic forms of information cascades are added. As an example, information cascades can be defined for Twitter, as follows. If a user $u_1$ replies to another user $u_2$ and mentions a hashtag #h, then user $u_1$ is influenced by user $u_2$ on the topic of #h. For a given topic, we may find some long influence paths in a social graph. However, in a synthetic graph, there may be only a few influence paths. Long influence paths can be identified in the input graph, and then the number of long influence paths in the synthetic graph can be checked to see how many influence paths should be added. An influence path can be added by adding influenced users one by one. For synthetic Twitter data, suppose that the goal is to add a user $u_1$ influenced by user $u_2$ on the topic of h. Then, "@$u_2$" is added at the beginning of one of $u_1$'s tweets and "#h" is added in this tweet.

Other synthetic attributes such as locations and geo-coordinates can be generated for social media posts, based on the correlation between locations of real posts (where available) and LDA topics of corresponding posts.

To improve scalability, input tweets are divided into multiple sets $T_1, T_2, \ldots$, by the posting time. The above generation procedure is applied to obtain a set of synthetic tweets $S_i$ for each set $T_i$. Instead of simply combining all sets of synthetic tweets to obtain synthetic tweets for original tweets, user names and hashtags are also updated in $S_{i+1}$ based on $S_i$ and the correlation between $T_{i+1}$ and $T_i$ (measured by the Jaccard index $|T_i \cap T_{i+1}|\backslash|T_i \cup T_{i+1}|$, where $|T|$ denotes the size of set T) such that the same time correlation can be observed among synthetic sets as those among original sets. Synthetic data generation is parallelized by generating synthetic social media for each set, and combining data sets through common user names and social media text entities.

While the invention has been taught with specific reference to these embodiments, one skilled in the art will recognize that changes can be made in form and detail without departing from the spirit and scope of the invention. Therefore, the described embodiments are to be considered, therefore, in all respects only as illustrative and not restrictive. As such, the scope of the invention is indicated by the following claims rather than by the description.

The invention claimed is:

1. A computer implemented system that generates a synthetic graph similar to a given interaction graph, comprising:
   a computer receiving an interaction graph;
   means to generate a synthetic graph, including a set of graphs generated with different parameters according to a social network model;
   means to calculate a distance of each synthetic graph to the input interaction graph based on a statistical feature, or the distance of each synthetic graph to the input interaction graph based on results from running a graph algorithm;

means to select the best set of parameters to minimize the distance between a synthetic graph and the input interaction graph;

means to select the best social network model with parameters that minimize the distance;

means to generate a synthetic interaction graph according to the selected social network model with the best set of parameters;

means to remove graph patterns of interest from the interaction graph;

means to generate a synthetic graph from this reduced interaction graph;

means to add graph patterns that have been removed back to the synthetic graph; and means to preserve community structures of the input interaction graph in the synthetic graph.

2. A computer implemented system that generates a synthetic graph similar to a given interaction graph, comprising:

a computer receiving an interaction graph;

means to generate a synthetic graph, including a set of graphs generated with different parameters according to a social network model;

means to calculate a distance of each synthetic graph to the input interaction graph based on a statistical feature, or the distance of each synthetic graph to the input interaction graph based on results from running a graph algorithm;

means to select the best set of parameters to minimize the distance between a synthetic graph and the input interaction graph;

means to select the best social network model with parameters that minimize the distance;

means to generate a synthetic interaction graph according to the selected social network model with the best set of parameters;

means to extract distributions of attributes from input social media data; and means to generate a synthetic graph jointly with attributes by assigning vertices and edges in a social network model according to attribute distributions.

3. A computer implemented system that generates a synthetic graph similar to a given interaction graph, comprising:

a computer receiving an interaction graph;

means to generate a synthetic graph, including a set of graphs generated with different parameters according to a social network model;

means to calculate a distance of each synthetic graph to the input interaction graph based on a statistical feature, or the distance of each synthetic graph to the input interaction graph based on results from running a graph algorithm;

means to select the best set of parameters to minimize the distance between a synthetic graph and the input interaction graph;

means to select the best social network model with parameters that minimize the distance;

means to generate a synthetic interaction graph according to the selected social network model with the best set of parameters; and means to generate a synthetic graph based on one social network model and then add another synthetic graph based on another method onto this first graph by adjusting the number of vertices generated by each graph model.

4. A computer implemented system that generates a synthetic graph similar to a given interaction graph, comprising:

a computer receiving an interaction graph;

means to generate a synthetic graph, including a set of graphs generated with different parameters according to a social network model;

means to calculate a distance of each synthetic graph to the input interaction graph based on a statistical feature, or the distance of each synthetic graph to the input interaction graph based on results from running a graph algorithm;

means to select the best set of parameters to minimize the distance between a synthetic graph and the input interaction graph;

means to select the best social network model with parameters that minimize the distance;

means to generate a synthetic interaction graph according to the selected social network model with the best set of parameters;

means to capture interaction types in terms of edge weights; and means to generate synthetic interaction types according to the distributions of these edge weights.

5. A computer implemented system that generates a synthetic graph similar to a given interaction graph, comprising:

a computer receiving an interaction graph;

means to generate a synthetic graph, including a set of graphs generated with different parameters according to a social network model;

means to calculate a distance of each synthetic graph to the input interaction graph based on a statistical feature, or the distance of each synthetic graph to the input interaction graph based on results from running a graph algorithm;

means to select the best set of parameters to minimize the distance between a synthetic graph and the input interaction graph;

means to select the best social network model with parameters that minimize the distance;

means to generate a synthetic interaction graph according to the selected social network model with the best set of parameters; and means to generate a sequence of graphs by preserving a statistical overlap of graph structures over time.

6. A computer implemented system that extracts textual content from a given social media data set and synthetically generates textual content similar to the input data, comprising:

a computer receiving social media data text;

means to divide social media posts according to the most likely topic;

means to train a Markov Chain for the distribution of grammar-aware word sequences in different languages, separately under each topic;

means to sample text data from the corresponding Markov Chain for each topic; and means to filter synthetic social media posts with identical text or grammar mistakes.

7. The means of claim 6, wherein synthetic social media text entities are generated, including:

means to extract the distribution of social media entities from the input social media data set; and means to synthetically generate placeholders for these entities by sampling them with the same distributions.

8. A computer implemented system that generates a large-scale synthetic social media data set by combining a synthetic graph and synthetic textual content with generated social media entities, comprising:

a computer receiving social media data;

means to establish a coupling of graph and text corresponding to the synthetic social media data set;

means to match a degree order of social media text entities in an input interaction graph and the synthetic graph;

means to find the most dominant topic per social media entity;

means to assign synthetic text generated under the topic corresponding to the social media text entities that are to be mentioned in a synthetic post; and means to add social media text entities to their placeholders in synthetic social media data and interactions in synthetic social media data to preserve cascades of interactions.

9. The system of claim 8, further including means to scale up social media data, including:

means to sample vertices and edges according to a fitted social network model beyond the size of the input interaction graph; and means to sample social media text and textual structures according to statistical properties of input social media data beyond the size of the input social media data.

10. The system of claim 8, wherein large scale social media data is generated in parallel, including:

means to divide input social media into multiple sets by the posting time;

means to generate synthetic social media for each set; and means to iteratively update user names and social media entities by maintaining time correlations between synthetic social media data sets similar to those among original sets.

* * * * *